United States Patent [19]

Stavalone

[11] 4,005,939
[45] Feb. 1, 1977

[54] OPTICAL COMPARATOR FOR TESTING PRINTED CIRCUIT BOARDS

[76] Inventor: Lawrence S. Stavalone, 7 Salmon Creek Drive, Hilton, N.Y. 14468

[22] Filed: Oct. 9, 1975

[21] Appl. No.: 621,249

[52] U.S. Cl. .............................. 356/165; 350/30; 356/168

[51] Int. Cl.² .................... G01B 9/08; G01B 11/24

[58] Field of Search .................... 356/165–166, 356/168, 71; 350/30; 340/146.3 H, 146.3 Q

[56] References Cited

FOREIGN PATENTS OR APPLICATIONS 1,303,466 1/1973 United Kingdom ............... 356/168
927,621 5/1963 United Kingdom ............... 356/166

OTHER PUBLICATIONS

Pope et al., "Comparison System for Microscope Images", Rev. of Scientific Instruments, vol. 37, 3-1966, pp. 377-378.

*Primary Examiner*—John K. Corbin
*Assistant Examiner*—Wm. H. Punter

[57] ABSTRACT

An optical comparator for comparing a master printed circuit board or other complex assembly with a manufactured board to determine whether the board being tested matches the master in all respects. The master board is placed in the rear chamber of the comparator and the test board is inserted in the front chamber thereof. The optical arrangement is such that when these chambers are alternately illuminated at a periodic rate, an observer sees the master and test boards alternately and at coincident positions so that if the two boards match in all respects, the observer receives the visual impression that he is seeing a continuously-illuminated single board. But if a component is missing from the test board or there is any other disparity between the two boards, then the alternate illumination of the boards gives rise to light pulsations indicative of this disparity.

9 Claims, 6 Drawing Figures

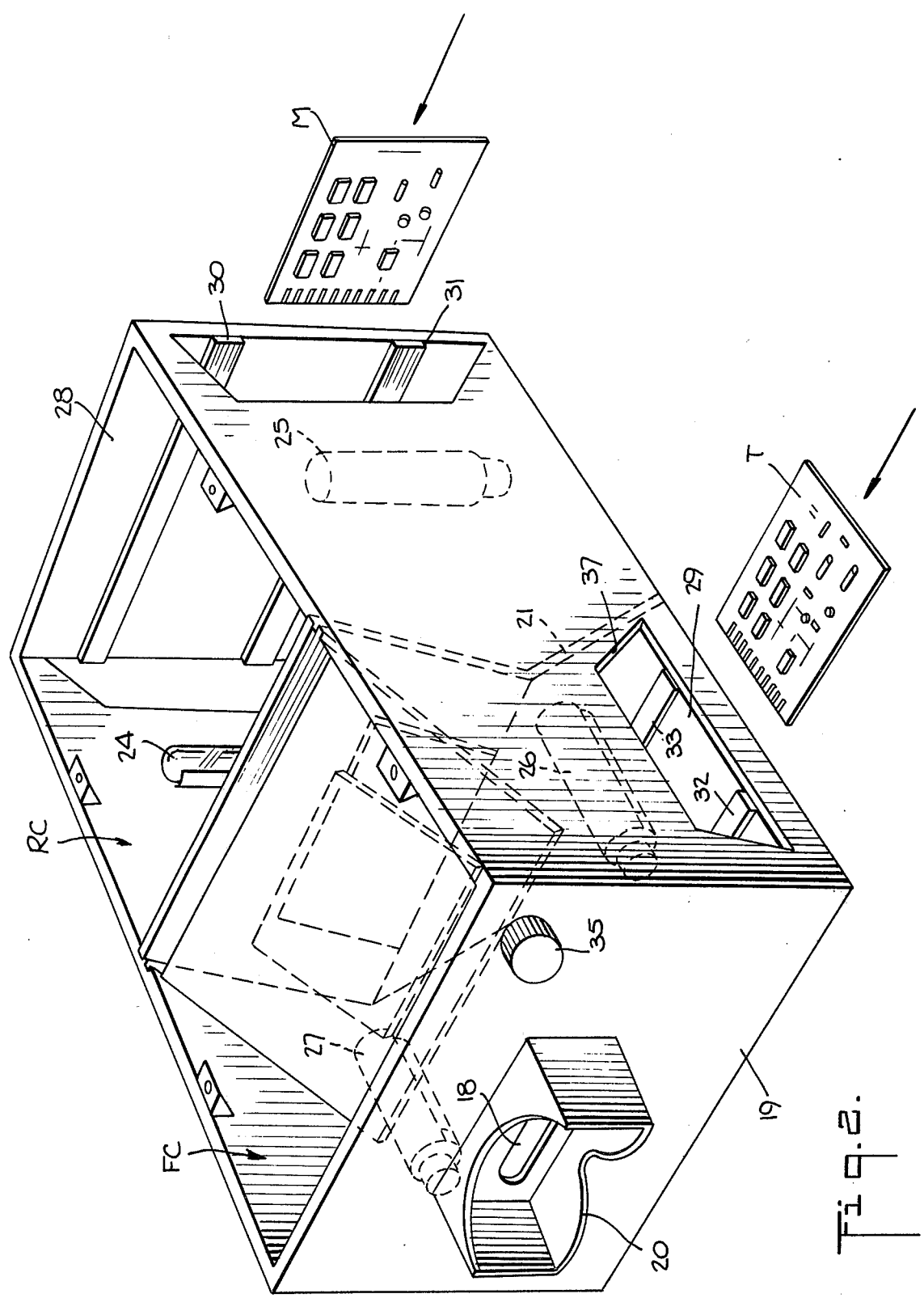

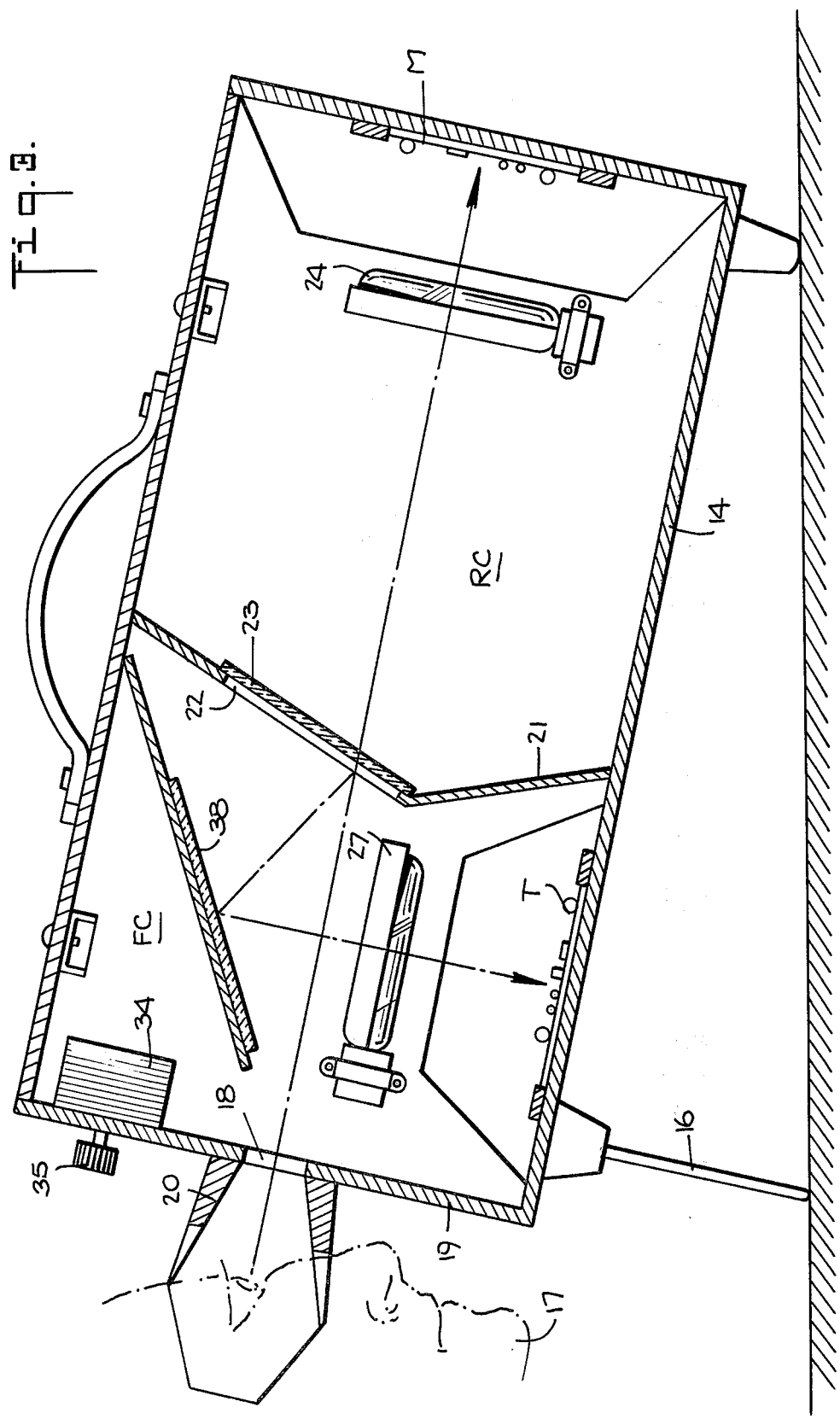

OPTICAL COMPARATOR FOR TESTING PRINTED CIRCUIT BOARDS

BACKGROUND OF INVENTION

This invention relates generally to the field of optical comparators wherein an object, such as a manufactured part, is compared with a standard object to determine if differences exist therebetween. In particular, the invention relates to an optical comparator of simple inexpensive design especially suitable for testing complex assemblies such as printed circuit boards.

The use of optical comparators to determine whether a manufactured part meets certain specifications is well known. In the typical commercial optical comparator, the part being tested is illuminated and a shadow thereof is projected on a screen, the shadow being brought into coincidence with an outline of a master or reference part engraved or otherwise formed on the screen. In this manner, an observer can check to see if the part being tested deviates in any way from the master.

An optical comparator of the above-described type requires the observer make a careful examination of the projected image to determine whether a disparity exists. Such comparators are unsuitable for testing manufactured parts which are highly complex, such as printed circuit boards containing hundreds of electronic components.

In a printed circuit board providing a miniaturize delectronic system, a conductive metal pattern, usually produced by an etching technique, is so laid out on an insulating panel as to make the necessary connections between resistors, capacitors, transistors and other circuit components. Connections between the leads of the components and the conductive pattern are made by inserting these leads into holes going through lands or pads in the conductive pattern, these connections being soldered by a dipping technique in which all of the soldered joints are formed at once.

The absence of a single component from the printed circuit board renders the board unacceptable. But with conventional optical comparators, a missing component is extremely difficult to detect by visual observation. Thus when comparing a master printed circuit board having hundreds of components scattered over the board with a manufactured board, the omission of a single tiny resistor can easily be overlooked.

To solve this problem, it is known to use optical comparators which are designed to call attention to missing details so that one can readily pick-out and identify distinctions between the master and the object being tested.

Thus in U.S. Pat. No. 3,744,917 the master and the test object are placed in side-by-side relation, such that when viewed through a mirror system, the master and test object are caused to optically fuse, the master and the test object being viewed by respective eyes of the observer. A rotating shutter intermittently interrupts the light path to each eye so that the fused images are actually viewed successively rather than simultaneously and differences between the compared objects appear as pulses indicative of the missing detail.

Similar optical comparators of the switching-type making use of a rotating shutter mechanism to alternatively view a master and a test object are disclosed in the IBM Technical Disclosure Bulletin, Vol. 10 No. 11, April 1968 (pages 1661 and 1662) and in Vol. 13, No. 12, May, 1971 (page 3630). In these comparators, if the object and the references are identical, the viewer sees a fixed image, but if a difference therebetween exists, a readily noticeable flicker is produced.

While image-switching optical comparators of the type heretofore known are effective in picking out missing details, they involve motors, rotary shutters and complicated mirrors, prisms, and other optical arrangements. As a consequence, such comparators are relatively cumbersome and costly.

SUMMARY OF INVENTION

In view of the foregoing, the main object of this invention is to provide an optical comparator of simple, reliable and efficient design capable of testing complex assemblies such as printed circuit boards, to determine whether disparities exist between the tested object and a standard or master.

More particularly, it is an object of the invention to provide an optical comparator in which the comparison is effected by alternate illumination of the test board and the master, thereby obviating the need for mechanically-operated shutters and complicated optical elements.

Still another object of this invention is to provide a comparator which may be operated without difficulty by a person of ordinary skill, the comparator avoiding visual fatigue and other drawbacks characteristic of existing types of comparators.

Briefly stated, in an optical comparator in accordance with the invention, use is made of a casing divided by a partition into a rear chamber and a front chamber, the partition having an inclined window therein formed by a see-through mirror. A master-printed circuit board is vertically-mounted in the rear chamber, this board being visible to an observer in a direct optical path extending forwardly between an observation opening in the front of the casing and passing through said window to the board, this path being operative only in a first state in which the rear chamber is illuminated and the front chamber dark, in which state the window is effectively transparent.

A printed circuit to be tested is inserted in the front chamber to occupy a horizontal position therein, the front chamber having a reflecting mirror disposed therein which is so inclined with respect to said window as to render the test board visible to the observer in an indirect optical path extending forwardly from the obervation opening to the window, upwardly from the window to the reflecting mirror and downwardly from the window to the test board. This indirect path is operative only in a second state in which the rear chamber is dark and the front chamber is illuminated, in which state the window is effectively reflective.

The placement of the printed circuit boards is such that as one switches from one state to the other, the observer alternately sees the master board and the test board at coincident positions, so that if the two board are identical in all respects, the impression received by the observer is of a single, continuously illuminated board. But if any difference exists, such as a missing component on the test board, this component will be seen in the first state and not in the second state. Hence, by alternately illuminating the chambers at a periodic rate, a pulsatory light signal will be produced identifying the missing component.

OUTLINE OF DRAWINGS

For a better understanding of the invention as well as other objects and further features thereof, reference is made to the following detailed description to be read in conjunction with the accompanying drawings, wherein:

FIG. 2 is another perspective view of the comparator, this view being a phantom with the interior elements exposed;

FIG. 3 is a longitudinal section taken through the comparator;

DESCRIPTION OF INVENTION

Figure 1:
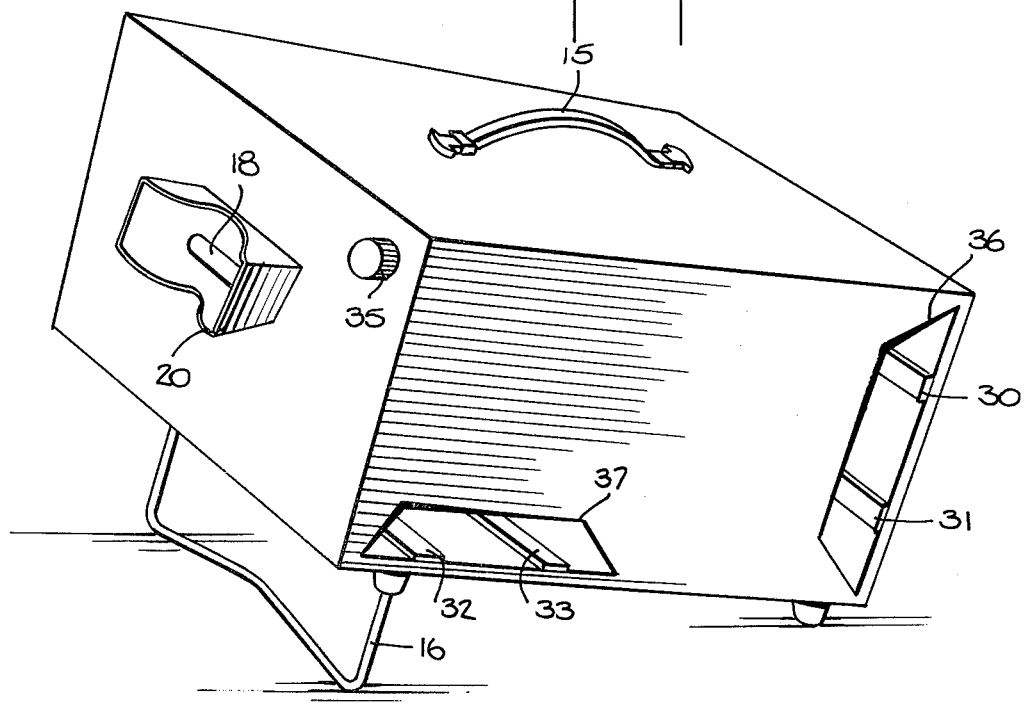
FIG. 1 is a perspective view of an optical comparator in accordance with the invention.
Figure 4:
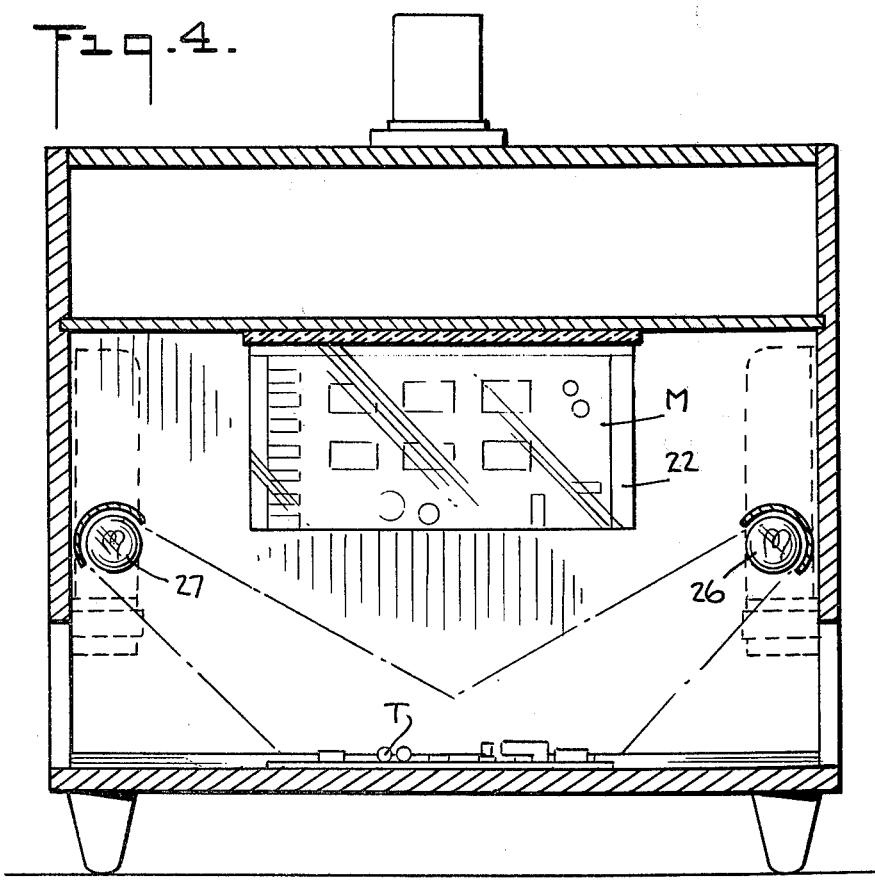
FIG. 4 is a transverse section taken through the comparator.
Figure 5:
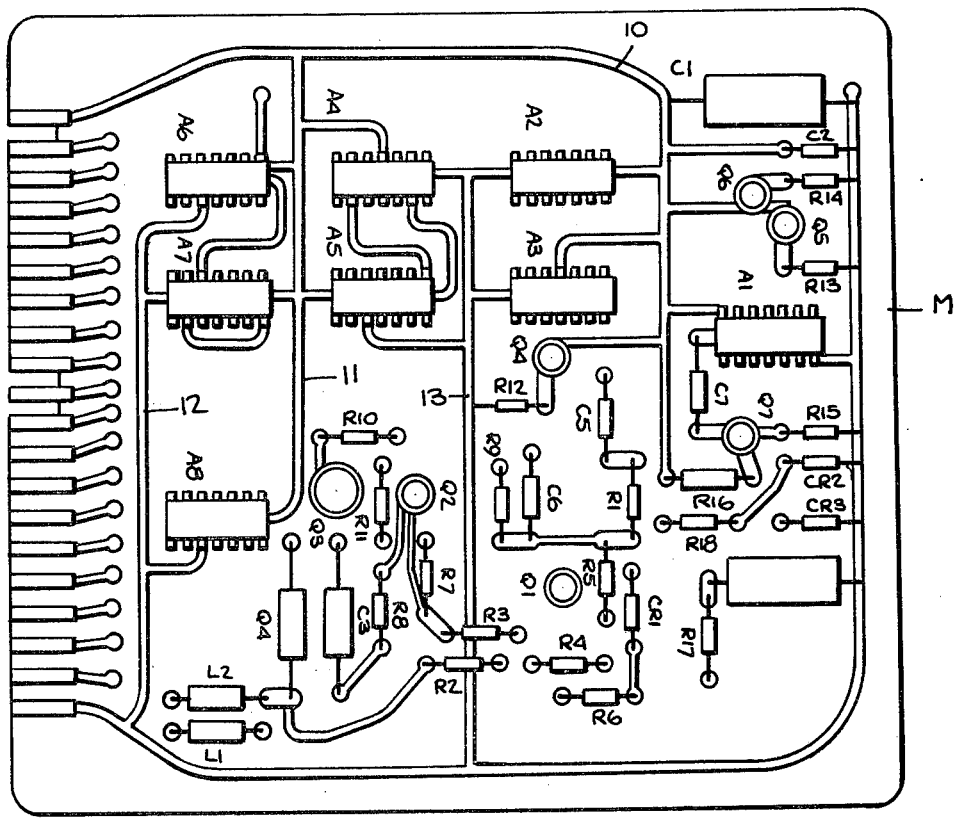
FIG. 5 is a plan view of an example of a master printed circuit board.
Figure 6:
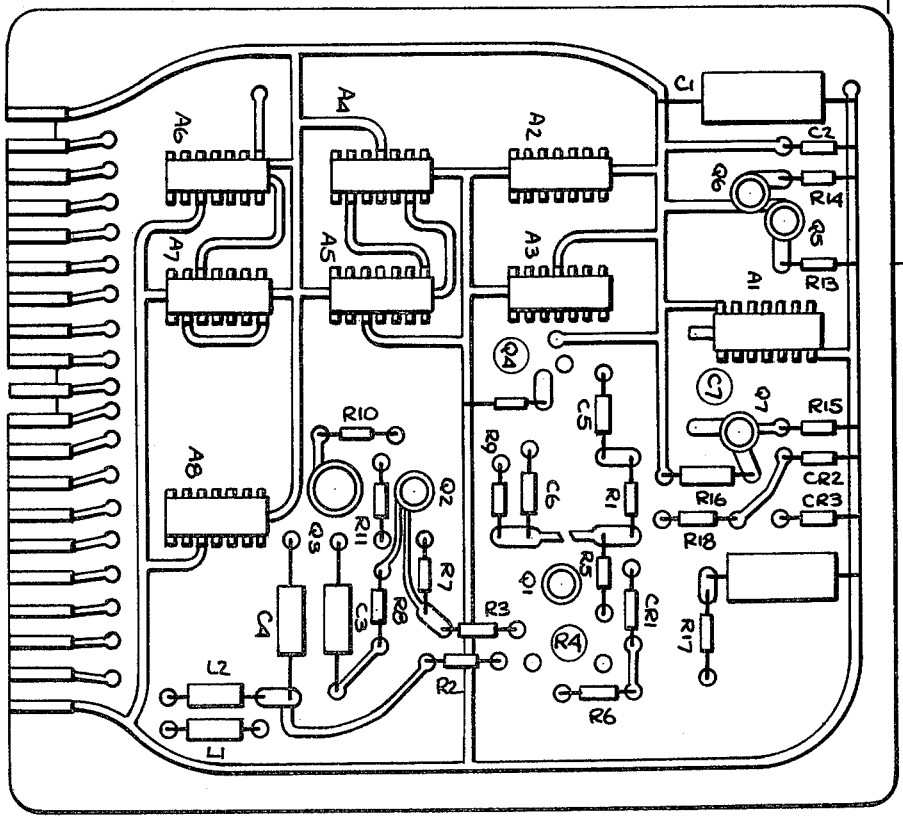
FIG. 6 is a plan view of a manufactured printed circuit board which fails to fully conform to the master.

Before considering the structure and function of the optical conparator, it may be helpful to first examine a typical master printed circuit board M, as shown in FIG. 5, and then compare this master with a manufactured printed circuit board T, as shown in FIG. 6, which is intended to match the master in all respects.

It will be seen that master M has a conductive metal pattern to provide necessary connections between the various components, such as conductive lines 10, 11, 12, and 13. Among the components shown in the master are coils $L_1$ and $L_2$, resistors $R_1$, $R_2$, $R_3$ and $R_4$, capacitors $C_1$, $C_2$, $C_3$ and $C_4$ and transistors $Q_1$, $Q_2$, $Q_3$ and $Q_4$.

But in the test printed circuit board T which should contain the same components at the same points of connection, it will be seen that resistor $R_4$ is missing and that capacitor $C_7$ and transistor $Q_4$ are also lacking.

The fact that these components are missing can of course be determined by a careful visual inspection of the test board, using the master as the guide. As a practical matter, however, one cannot in a mass-production operation, carry out this visual inspection without a considerable slow-down in production. Moreover, visual fatigue would inevitably result, as a result of which many defective boards would pass inspection. The missing parts are encircled in FIG. 6.

The purpose therefore of an optical comparator in accordance with the invention is to provide a rapid, efficient and reliable means of determining whether the test board matches the master board and, if not, where disparities exist.

Referring not to FIGS. 1 to 4, there is shown an optical comparator in accordance with the invention, the comparator including a box-like casing 14 having a handle 15, the structure being relatively light-weight and portable, since it involves but a few components and no moving parts. The casing is provided with rear legs and a retractable front pedestal 16 so that the front of the casing may be raised somewhat for the convenience of an observer 17 who looks through an opening 18 in the front wall 19 of the casing. The opening is surrounded by a protective shield 20 to exclude ambient light.

The casing is divided by a partition 21 into a rear chamber RC and a front chamber FC. Partition 21 includes an inclined upper section having a window 22 formed therein covered by a see-through mirror 23.

Installed on either side of rear chamber RC is a pair of light bulbs 24 and 25 which, when energized, illuminate this chamber. Installed on either side of the front chamber FC is a similar pair of light bulbs 26 and 27 which, when energized, illuminate this chamber.

It will be seen that bulbs 24 and 25 are provided with curved shields and are oriented primarily to illuminate the master printed circuit board M placed adjacent the rear wall 28 of the casing, so that very little light from the rear chamber enters the front chamber through the window. Similarly, bulbs 26 and 27 are shielded and are so oriented as to primarily illuminate the test printed circuit board T placed on the floor 29 of the casing in the front chamber, so that very little light from this source enters the rear chamber through the window.

It is important that the master and test printed circuit boards occupy predetermined positions in their respective chambers so that when observed alternately, the boards appear to be exactly coincident. For this purpose, master board M is confined within a pair of tracks 30 and 31 attached to the rear wall of the casing, while test board T is confined within a like pair of tracks 32 and 33 attached to the base of the casing.

These tracks precisely locate the boards, in one coordinate, and to ensure coincidence the tracks are provided with stops (not shown) to retain the boards at their proper positions within the tracks. Access to the rear chamber tracks is through side slot 36 and access to the front chamber tracks is through a side slot 37. Thus in practice, one simply slides the boards into place.

The pair of lamps 24 and 25 are simultaneously energized to illuminate rear chamber RC, and the pair of lamps 26 and 27 are simultaneously energized to illuminate front chamber FC. The lamp pairs are alternately energized by a solid-state, flip-flop control circuit 34 mounted within the front chamber against front wall 19, the circuit including a control potentiometer provided with a dial 35 whose adjustment makes it possible to set the periodic rate so that the chambers are alternately illuminated.

A reflecting mirror 38 is supported within front chamber FC at an angle relative to the see-through mirror 23 such that when mirror 23 is reflective, which occurs in the state when the rear chamber is dark and the front chamber is illuminated, an indirect optical path is extended forwardly from opening 18 to see-through mirror 23, then upwardly from mirror 23 to reflecting mirror 38 and downwardly from this mirror to test board T. Thus in this state an observer is able to see the test board in the illuminated front chamber but not the master board in the dark rear chamber.

In the alternative state in which the front chamber is dark and the rear chamber is illuminated, then the indirect optical path is inoperative and a direct optical path is established extending forwardly from opening 18 through see-through mirror 28 to master board M. Thus in this state, the observer sees the master PC board but not the test PC board.

By alternately switching from one state to the second state at a periodic rate determined by the potentiometer setting of the electronic control circuit, one alternately sees the master board and the test board at coincident positions. If these boards are alike in all respects, the visual impression gained is that of a continuously-illuminated single board, for the eye of the observer discerns no distinction between the two boards.

But the absence of a component on the test board, a break in the conductive metal pattern or any other disparity between the two PC boards, gives rise to a distinction between the alternately-observed boards, as a result of which a pulsatory light appears at the point where the disparity exists, thereby signalling a defective board and identifying the defect.

While the invention has been described in the context of inspecting printed circuit boards, it will be appreciated that it is usable for testing a whole range of manufactured products. It will also be evident that many changes may be made in the optical comparator without departing from the essential spirit of the invention.

I claim:

1. An optical comparator for testing a printed circuit board or other complex assembly to determine whether it matches a master printed circuit board, said comparator comprising:
   A. a casing divided by a partition into a normally-dark front chamber and a normally-dark rear chamber, the front wall of the casing having an observation port therein, the partition having an inclined see-through mirror therein in alignment with said port, said see-through mirror being effectively transparent when only the normally-dark rear chamber is illuminated and being effectively reflective when only the normally-dark front chamber is illuminated;
   B. means alternately to illuminate said normally-dark front and rear chambers at a periodic rate whereby in a first state in which the rear chamber is illuminated while the front chamber is dark, one may from said port look in a direct optical path through said see-through mirror which is then transparent into said rear chamber to see said master board which is disposed therein;
   C. means to support said master board in said rear chamber at a predetermined position therein where it is fully visible from said port in said first state;
   D. a reflecting mirror disposed in said front chamber at an angle to said see-through mirror, said see-through mirror being so disposed with respect to said reflecting mirror to provide an optical path in which the line from the eye of the observer to the see-through mirror is normal to the line from the reflecting mirror to the test board, whereby in a second state in which the front chamber is illuminated while the rear chamber is dark, the see-through mirror is then reflective and cooperates with said reflecting mirror so that one may from said port look by way of an indirect optical path into said front chamber to see said test board which is disposed therein; and
   E. means to support said test board in said front chamber at a position therein where it can be seen from said port in said second state at a position which appears to be coincident with the predetermined position at which the master board is seen in said first state, whereby when the test board matches the master board, the visual impression is that of a continuously-illuminated image, but if a disparity exists therebetween, light pulses are produced at said periodic rate indicating a disparity therebetween.

2. A comparator as set forth in claim 1, wherein said casing includes a slot to admit said test board into said front chamber and a separate slot to admit the master board into said rear chamber.

3. A comparator as set forth in claim 2, further including guide tracks in said chambers to receive the respective boards.

4. A comparator as set forth in claim 3, wherein said master board is placed adjacent the rear wall of said rear chamber and said test board is placed adjacent the floor of said chamber.

5. A comparator as set forth in claim 1, wherein said illumination means is consitituted by a pair of lamps disposed on opposite sides of the front chamber and a pair of lamps disposed on opposite sides of the rear chamber.

6. A comparator as set forth in claim 5, wherein said lamps are shielded to direct the rays thereof toward the respective boards.

7. A comparator as set forth in claim 5, wherein said pairs of lamps are alternately energized by a square-wave oscillator.

8. A comparator as set forth in claim 7, wherein said oscillator frequency is controllable to vary the rate at which the lamps are alternately energized.

9. A comparator as set forth in claim 1, further including means to shield said port against ambient light.

* * * * *

UNITED STATES PATENT OFFICE
CERTIFICATE OF CORRECTION

PATENT NO. : 4,005,939
DATED : February 1, 1977
INVENTOR(S) : Lawrence S. Stavalone It is certified that error appears in the above-identified patent and that said Letters Patent are hereby corrected as shown below:

Column 1, line 30 "miniaturize" should have read
-- miniaturized --
Column 1, line 31 "delectronic" should have read
-- electronic --

Column 2, line 59 "board" second occurrence, should have read
-- boards --

Column 3, line 10 "a" should have read -- in --
Column 3, line 53 "not" should have read -- now --

Claim 5, line 2 "consitituted" should have read
--constituted --

Signed and Sealed this

Sixth Day of December 1977

[SEAL]

Attest:

RUTH C. MASON
Attesting Officer

LUTRELLE F. PARKER
Acting Commissioner of Patents and Trademarks